US009049737B2

(12) United States Patent
Oliveira et al.

(10) Patent No.: US 9,049,737 B2
(45) Date of Patent: *Jun. 2, 2015

(54) MULTIPLEXING AND DEMULTIPLEXING RADIO CHANNELS (75) Inventors: Marcelo Oliveira, San Jose, CA (US); Steven Christenson, Campbell, CA (US); Amit Barave, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/311,545

(22) Filed: Dec. 5, 2011

(65) Prior Publication Data

US 2012/0093057 A1 Apr. 19, 2012

Related U.S. Application Data (63) Continuation of application No. 12/411,012, filed on Mar. 25, 2009, now Pat. No. 8,098,610.

(51) Int. Cl.
*H04W 72/12* (2009.01)
*H04L 29/06* (2006.01)
*H04L 12/18* (2006.01)
(Continued)

(52) U.S. Cl.
CPC .......... *H04W 72/1242* (2013.01); *H04L 63/08* (2013.01); *H04L 45/00* (2013.01); *H04L 12/189* (2013.01); *H04W 72/005* (2013.01); *H04W 72/1273* (2013.01)

(58) Field of Classification Search
CPC ... H04L 12/66; H04L 65/403; H04L 65/1093; H04L 63/102; H04L 12/189; H04M 3/42221; H04H 20/67; H04W 4/12; H04W 72/005
USPC ........ 455/3.01, 3.06; 370/310, 312, 351, 389, 370/390, 392, 400; 726/4
See application file for complete search history.

(56) References Cited

U.S. PATENT DOCUMENTS 6,094,578 A 7/2000 Purcell et al.
6,185,205 B1 2/2001 Sharrit et al.
6,233,315 B1 5/2001 Reformato et al.
(Continued)

OTHER PUBLICATIONS

USPTO Sep. 30, 2011 Notice of Allowance from U.S. Appl. No. 12/411,012.
(Continued)

*Primary Examiner* — Jung Park
*Assistant Examiner* — Chuong M Nguyen
(74) *Attorney, Agent, or Firm* — Patent Capital Group (57) ABSTRACT In one embodiment, a method and apparatus of multiplexing and demultiplexing radio channels includes receiving data through at least one multicast media channel available for use in an Internet Protocol Interoperability and Communications System (IPICS) comprising multiple communication endpoints linkable to a Land Mobile Radio (LMR) in the IPICS; channel mapping the at least one multicast media channel to multiple media channels of the LMR; receiving an audio signal through the at least one multicast media channel; controlling access to the LMR by applying communication access control policies based on the received data upon reception of the audio signal; and operatively linking the LMR to a specified endpoint through the at least one multicast media channel based on the communication access control policies.

21 Claims, 5 Drawing Sheets (51) Int. Cl.
*H04L 12/701* (2013.01)
*H04W 72/00* (2009.01)

(56) References Cited

U.S. PATENT DOCUMENTS

| | | | |
|---|---|---|---|
| 6,813,250 B1 | 11/2004 | Fine et al. | |
| 6,912,389 B2 | 6/2005 | Bright et al. | |
| 7,072,952 B2 | 7/2006 | Takehiro et al. | |
| 7,339,900 B2 | 3/2008 | Perlman | |
| 7,352,707 B2 | 4/2008 | Ho et al. | |
| 7,369,513 B1 | 5/2008 | Sankaran | |
| 7,460,492 B2 | 12/2008 | Portolani et al. | |
| 7,463,597 B1 | 12/2008 | Kompella | |
| 2004/0057449 A1 | 3/2004 | Black | |
| 2006/0092865 A1 | 5/2006 | Williams | |
| 2006/0281471 A1 | 12/2006 | Shaffer et al. | |
| 2007/0049314 A1* | 3/2007 | Balachandran et al. | 455/518 |
| 2007/0280195 A1* | 12/2007 | Shaffer et al. | 370/351 |
| 2008/0313711 A1* | 12/2008 | Christenson et al. | 726/4 |
| 2009/0073909 A1* | 3/2009 | Cai et al. | 370/312 |
| 2010/0135197 A1 | 6/2010 | Martinez | |
| 2010/0246466 A1 | 9/2010 | Oliveira et al. | |

OTHER PUBLICATIONS

Oct. 14, 2011 RCE filed in response to Notice of Allowance received Sep. 30, 2011 from U.S. Appl. No. 12/411,012.

Oct. 25, 2011 Notice of Allowance from from U.S. Appl. No. 12/411,012.

Wikipedia, "Plectron," http://en.wikipedia.org/wiki/Plectron, Dec. 18, 2008, 2 pages.

Thunder Eagle, Inc.—Radio Wireless Alerting Systems, "MRI-100™: Multi Radio Interface," http://www.thuneagle.com/mri100.htm, Dec. 18, 2008, 2 pages.

Positron Public Safety Systems, "Product Specifications: Power RADIO," http://www.positron911.com/products/powerRADIO/powerRADIO_specs.asp, Dec. 18, 2008, 2 pages.

Wikipedia, "Minimum spanning tree," http://en.wikipedia.org/wiki/Minimum_spanning_tree, Dec. 18, 2008, 5 pages.

Wikipedia, "Distributed minimum spanning tree," http://en.wikipedia.org/wiki/Distributed_minimum_spanning_tree, Dec. 18, 2008, 2 pages.

* cited by examiner

MULTIPLEXING AND DEMULTIPLEXING RADIO CHANNELS

RELATED APPLICATION

This application is a continuation (and claims the benefit of priority under 35 U.S.C. §120) of U.S. application Ser. No. 12/411,012, filed Mar. 25, 2009, issued as U.S. Pat. No. 8,098,610 on Jan. 17, 2012, entitled "MULTIPLEXING AND DEMULTIPLEXING RADIO CHANNELS," Inventor(s) Marcelo Oliveira, et al. The disclosure of the prior application is considered part of (and is incorporated by reference in) the disclosure of this application.

TECHNICAL FIELD

The embodiments herein generally relate to communication networks, and, more particularly, to signal processing and re-using bandwidth in communication networks.

BACKGROUND

The Internet Protocol Interoperability and Communications System (IPICS) available from Cisco Systems, Inc., San Jose, Calif., USA, which enables communications between multiple devices, leverages multicast networks as a means to support the media routing between endpoints participating in a virtual talk group (VTG). In cases where the multicast routing (i.e., simultaneously sending information packets to a group of destinations) is not feasible, the endpoints send and receive media over unicast (i.e., sending information packets to a single destination). A typical VTG carries a mix of multicast and unicast traffic.

The IPICS interfaces with Land Mobile Radios (LMRs) via a Land Mobile Radio Gateway (LMRG). This gateway simply maps one multicast group in the IP network to an Ear/Earth (E) & Mouth/Magnet (M) interface that is then connected to the radio. The IPICS uses this mechanism to receive and transmit audio over the radio network. Even though a radio can be tuned to a multitude of channels, all channels share a single multicast address. This is a significant limitation in terms of access control and interoperability to the IPICS. For instance, assume a radio could be tuned to the fire department frequency as well as to the police frequency; the IPICS administrator would then like to provision some users with access only to the police channel and not to the fire department channel. This is not possible on the current system because a single multicast address is shared by the two channels on the same radio, and most of the IPICS's endpoints are only able to differentiate channels on the basis of different multicast addresses.

BRIEF DESCRIPTION OF THE DRAWINGS

The embodiments herein will be better understood from the following detailed description with reference to the drawings, in which.

DESCRIPTION OF EXAMPLE EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Overview

In view of the foregoing, an embodiment herein provides a method of multiplexing and demultiplexing radio channels, wherein the method comprises receiving data through at least one multicast media channel available for use in an Internet Protocol Interoperability and Communications System (IPICS) comprising multiple communication endpoints linkable to a Land Mobile Radio (LMR) in the IPICS; channel mapping the at least one multicast media channel to multiple media channels of the LMR; receiving an audio signal through the at least one multicast media channel; controlling access to the LMR by applying communication access control policies based on the received data upon reception of the audio signal; and operatively linking the LMR to a specified endpoint through the at least one multicast media channel based on the communication access control policies. The controlling access process may comprise tuning the LMR to a specified multicast media channel; proxying the audio signal to the LMR; and directing only one-way communication from the LMR to the multiple communication endpoints.

Additionally, the controlling access process may comprise dropping reception of the audio signal if another transmission of audio signals is previously and simultaneously occurring on a different media channel on the LMR. Furthermore, the controlling access process may comprise creating a priority of channels on the LMR; receiving a first audio signal on a first channel; receiving a second audio signal on a second channel; comparing priorities assigned to the first and second channels; and dropping reception of audio signals corresponding to lower prioritized channels.

The method may further comprise re-streaming the audio signal to a radio multicast upon receipt of the audio signal from the at least one multicast media channel; sending the re-streamed audio signal to the LMR; and transmitting the re-streamed audio signal in a specified multicast media channel frequency over the air. Moreover, the method may further comprise querying the LMR to determine what channel the LMR is currently tuned to; re-streaming the audio signal to the at least one multicast media channel; and receiving the re-streamed audio signal and an identification of the tuned channel in the specified endpoint in the at least one multicast media channel. Also, the communication endpoints may comprise any of push-to-talk media centers (PMC), internet protocol (IP) Phones over multicast, IP and public switched telephone network (PSTN) phones over IP Telephony gateway, and radios over LMR gateways.

Another embodiment provides an apparatus for multiplexing and demultiplexing radio channels, wherein the apparatus comprises a communications port that receives data through at least one multicast media channel available for use in an Internet Protocol Interoperability and Communications System (IPICS) comprising multiple communication endpoints linkable to a Land Mobile Radio (LMR) in the IPICS, wherein channel mapping of the at least one multicast media channel to multiple media channels of the LMR occurs such that channel mapping information is known; means for receiving an audio signal through the at least one multicast media channel; means for controlling access to the LMR by applying communication access control policies based on the received data upon reception of the audio signal; and means for operatively linking the LMR to a specified endpoint through the at least one multicast media channel based on the communication access control policies. The communication access control policies may comprise tuning the LMR to a specified multicast media channel; proxying the audio signal to the LMR; and directing only one-way communication from the LMR to the multiple communication endpoints.

Furthermore, the communication access control policies may comprise dropping reception of the audio signal if another transmission of audio signals is previously and simultaneously occurring on a different media channel on the LMR. Additionally, the communication access control policies may comprise creating a priority of channels on the LMR; receiving a first audio signal on a first channel; receiving a second audio signal on a second channel; comparing priorities assigned to the first and second channels; and dropping reception of audio signals corresponding to lower prioritized channels.

The apparatus may further comprise means for re-streaming the audio signal to a radio multicast upon receipt of the audio signal from the at least one multicast media channel; means for sending the re-streamed audio signal to the LMR; and means for transmitting the re-streamed audio signal in a specified multicast media channel frequency over the air. Moreover, the apparatus may further comprise means for querying the LMR to determine what channel the LMR is currently tuned to; means for re-streaming the audio signal to the at least one multicast media channel; and means for receiving the re-streamed audio signal and an identification of the tuned channel in the specified endpoint in the at least one multicast media channel. Also, the communication endpoints may comprise any of PMCs, IP Phones over multicast, IP and PSTN phones over IP Telephony gateway, and radios over LMR gateways.

Another embodiment provides a multiplexing and demultiplexing apparatus comprising a first communications port that receives data through at least one multicast media channel available for use in an Internet Protocol Interoperability and Communications System (IPICS) comprising multiple communication endpoints linkable to a Land Mobile Radio (LMR) in the IPICS, wherein channel mapping of the at least one multicast media channel to the multiple media channels of the LMR occurs such that channel mapping information is known; a second communications port that receives an audio signal through the at least one multicast media channel; logic that controls access to the LMR by applying communication access control policies based on the received data upon reception of the audio signal; and a communication link interface that operatively the LMR to a specified endpoint through the at least one multicast media channel based on the communication access control policies. The communication access control policies may comprise tuning the LMR to a specified multicast media channel; proxying the audio signal to the LMR; and directing only one-way communication from the LMR to the multiple communication endpoints.

Moreover, the communication access control policies may comprise dropping reception of the audio signal if another transmission of audio signals is previously and simultaneously occurring on a different media channel on the LMR. Additionally, the communication access control policies may comprise creating a priority of channels on the LMR; receiving a first audio signal on a first channel; receiving a second audio signal on a second channel; comparing priorities assigned to the first and second channels; and dropping reception of audio signals corresponding to lower prioritized channels.

Furthermore, a multiplexing component of the apparatus is configured to re-stream the audio signal to a radio multicast upon receipt of the audio signal from the at least one multicast media channel; send the re-streamed audio signal to the LMR; and transmit the re-streamed audio signal in a specified multicast media channel frequency over the air. Also, a demultiplexing component of the apparatus is configured to query the LMR to determine what channel the LMR is currently tuned to; re-stream the audio signal to the at least one multicast media channel; and receive the re-streamed audio signal and an identification of the tuned channel in the specified endpoint in the at least one multicast media channel. Furthermore, the communication endpoints may comprise any of PMCs, IP Phones over multicast, IP and PSTN phones over IP Telephony gateway, and radios over LMR gateways.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION

The embodiments provide a seamless interface between the IPICS endpoints and the channels residing on a radio resource. Referring now to the drawings, and more particularly to FIGS. 1 through 5, where similar reference characters denote corresponding features consistently throughout the figures, there are shown example embodiments.

Figure 1:
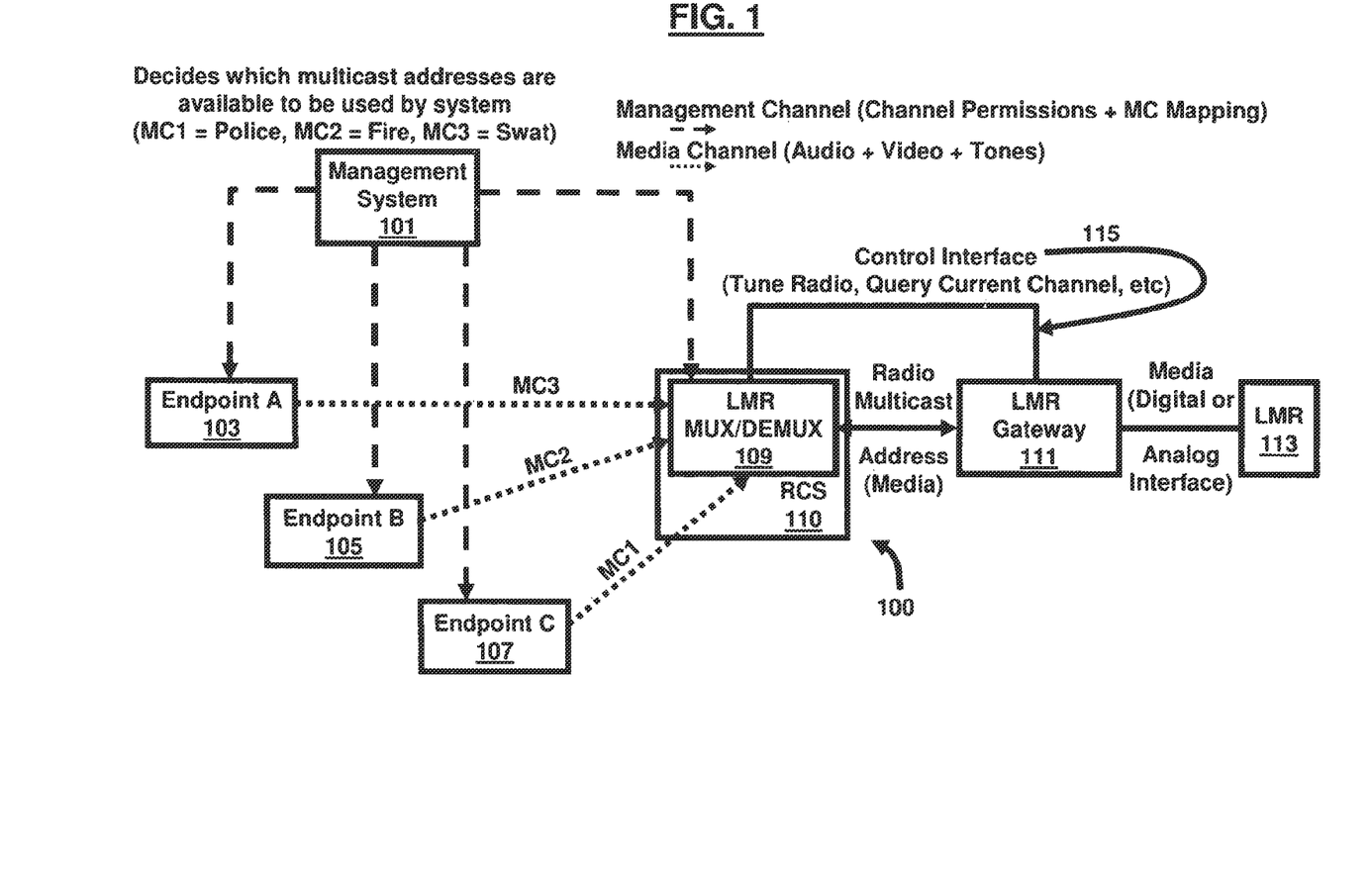
FIG. 1 illustrates a schematic diagram of an IPICS according to an embodiment herein.

FIG. 1 illustrates a block diagram of an IPICS 100 comprising a management system 101, which decides which multicast addresses are available to be used by the system 100. The management system 101 may be embodied as hardware, software, or a combined hardware/software configuration. For purposes of illustration and example, in FIG. 1, media channels (MCs) include audio plus video plus tones media. Furthermore, within the context of the embodiments herein, channels generally refers to the communication medium through which data packets are transmitted in a communications network. The embodiments herein are not limited to any particular type of communication medium or communications network. MC1 refers to the police channel (from the previous example), MC2 refers to the fire channel, and MC3 refers to the swat channel. Extending from the management system 101 is a plurality of management channels, which includes channel permissions plus MC mapping instructions.

A first management channel operatively connects from the management system 101 to an endpoint A 103. A second management channel operatively connects from the management system 101 to an endpoint B 105. A third management channel operatively connects from the management system 101 to an endpoint C 107. The types of endpoints currently supported are PMCs, IP Phones over multicast, IP and PSTN phones over IP Telephony gateway, and radios over land mobile radio gateways. Furthermore, the IPICS 100 may support additional types of endpoints.

A fourth management channel operatively connects from the management system 101 to an LMR mux/demux 109. MC1 connects Endpoint C 107 to the LMR mux/demux 109. MC2 connects Endpoint B 105 to the LMR mux/demux 109. MC3 connects Endpoint A 103 to the LMR mux/demux 109. The LMR mux/demux 109 may be embodied as a single device or a combined dual-operational device wherein the multiplexing (mux) operation selects one of many input signals (analog or digital), which carries several communications channels, and outputs the signals into a single line. Thereafter, the demultiplexing (demux) operation takes the single input signal carrying the several communications channels and separates it to multiple output signals for transmission on one of many data output lines that is connected to the single input.

A control interface 115 extends between the LMR mux/demux 109 and a LMR gateway 111. The control interface 115 may be embodied as hardware, software, or a combined hardware/software configuration. In the context of the embodiments herein, the control interface 115 comprises an IP data channel between the LMR mux/demux 109 and the LMR gateway 111 and the control commands and responses are relayed over this channel. The control interface 115 defines the tune radio, query current channel, etc. In this regard, the radio handsets/base stations support control functions such as tuning it to a particular frequency (also referred to as the radio channel), and retrieving information about the channel (frequency) it is presently tuned to. Most radio vendors expose these functions through proprietary control interfaces that involve sending data/binary commands over a communication channel such as a serial port. In the context of the embodiments herein the LMR mux/demux 109 defines and sends such control messages to the LMR gateway 111 using the protocol supported by the LMR gateway 111. The LMR gateway 111 then translates those commands to respective radio specific commands and sends those control messages to the radio base station or donor handset, captures the response, and relays the response back to the LMR mux/demux 109. Moreover, a radio multicast address (media) is exchanged between the LMR mux/demux 109 and the LMR gateway 111. The LMR gateway 111 is configured as a network point that acts as an entrance to another IP-based network. In this regard, the LMR gateway 111 may be configured as any type of networking device including, for example, a proxy server, firewall server, router, switch, or bridge. Moreover, the LMR gateway 111 may be embodied as hardware, software, or a combined hardware/software configuration. For example, in a software configuration the LMR gateway 111 may be installed within a router. Furthermore, a LMR 113 is operatively connected to the LMR gateway 111 via media having a digital or analog interface. The LMR 113 may be used by mobile terrestrial users in vehicles or on foot, and could be used by emergency first responder organizations, public works organizations, military personnel, or companies with large vehicle fleets or numerous field staff, for example.

Figure 2:
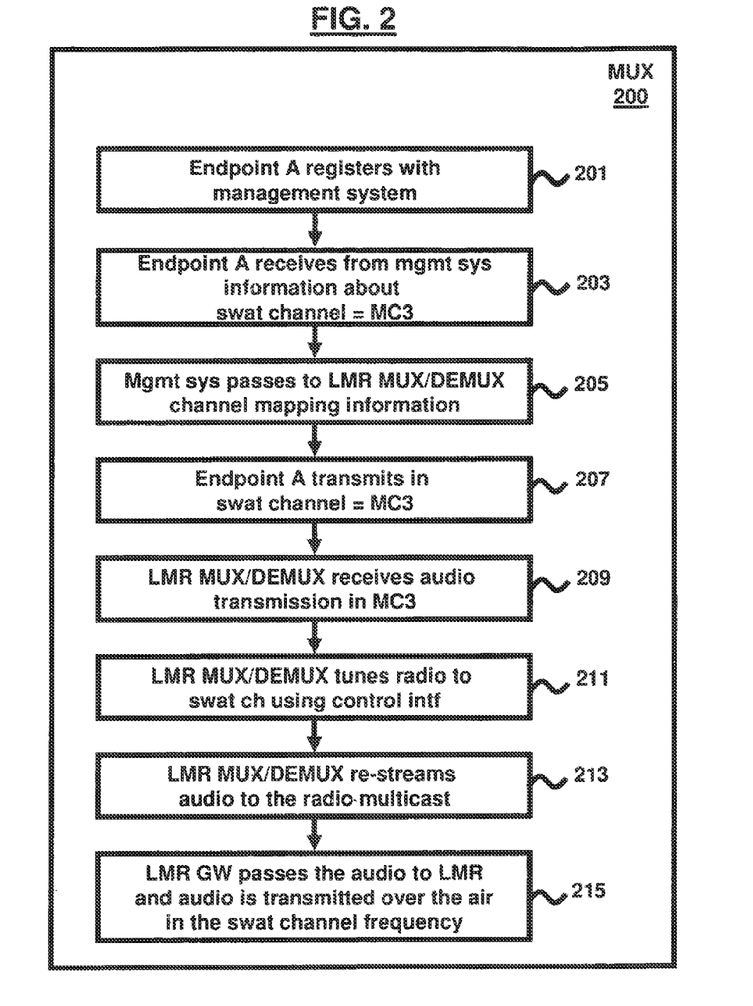
FIG. 2 is a flow diagram illustrating a processing sequence in a Mux according to an embodiment herein.

FIG. 2, with reference to FIG. 1, is a flow diagram illustrating a processing sequence in the Mux 200 of the LMR mux/demux 109 of FIG. 1 according to an embodiment herein. In this sequence, Endpoint A 103 registers (201) with the management system 101. Thereafter, Endpoint A 103 receives (203), from the management system 101, information about a media channel (e.g., swat channel=MC3). This is a particular channel the endpoint (or specifically, the user logged in into the endpoint) is given access to. The endpoint, in order to talk or listen to the swat channel, for example, communicates on multicast address MC3. Then, the management system 101 passes (205) channel mapping information to the LMR mux/demux 109. Next, Endpoint A 103 transmits (207) its signals in the swat channel=MC3. Then, the LMR mux/demux 109 receives (209) audio transmission in MC3. At this stage, the LMR mux/demux 109 has received the audio from Endpoint A 103 and has to determine which particular radio frequency the LMR 113 should tune in to. The LMR mux/demux 109 uses the channel mapping information sent by the management system 101 and learns that the multicast address MC3 should be mapped to the swat frequency on the LMR 113. The LMR mux/demux 109 then tunes (211) the radio to the swat channel frequency using the control interface 115. Next, the LMR mux/demux 109 re-streams (213) the audio received on swat multicast address MC3 to the radio multicast (RMC). Then, the LMR gateway 111 passes (215) the audio to the LMR 113 and the audio is transmitted over the air in the swat channel frequency.

The flow diagram of FIG. 2 may be summarized as follows: Endpoint A 103 sends data on MC3; LMR mux/demux 109 listens on MC3 and looks up the matching radio frequency for MC3 from the mapping table sent by the management system 101; LMR gateway 111 tunes LMR 113 to the frequency that was looked up; after tuning the frequency, the RMC now receives audio from the swat channel; LMR mux/demux 109 re-streams audio from MC3 to radio the multicast RMC. Effectively, the single radio (LMR 113) with a corresponding multicast address RMC is dynamically tuned and bridged for the swat channel MC3. Using the above flow, the same radio 113 could be tuned to any other frequency/channel and dynamically patched to a corresponding multicast address. This eliminates the need for having one LMR radio 113 statically tuned to a particular frequency and corresponding multicast address, which would have meant having 'N' such radios for a system wanting to tune into to 'N' different frequencies. With the use of the LMR mux/demux 109, just one radio 113 is needed to tune into 'N' different frequencies and map them to different multicast addresses dynamically.

Figure 3:
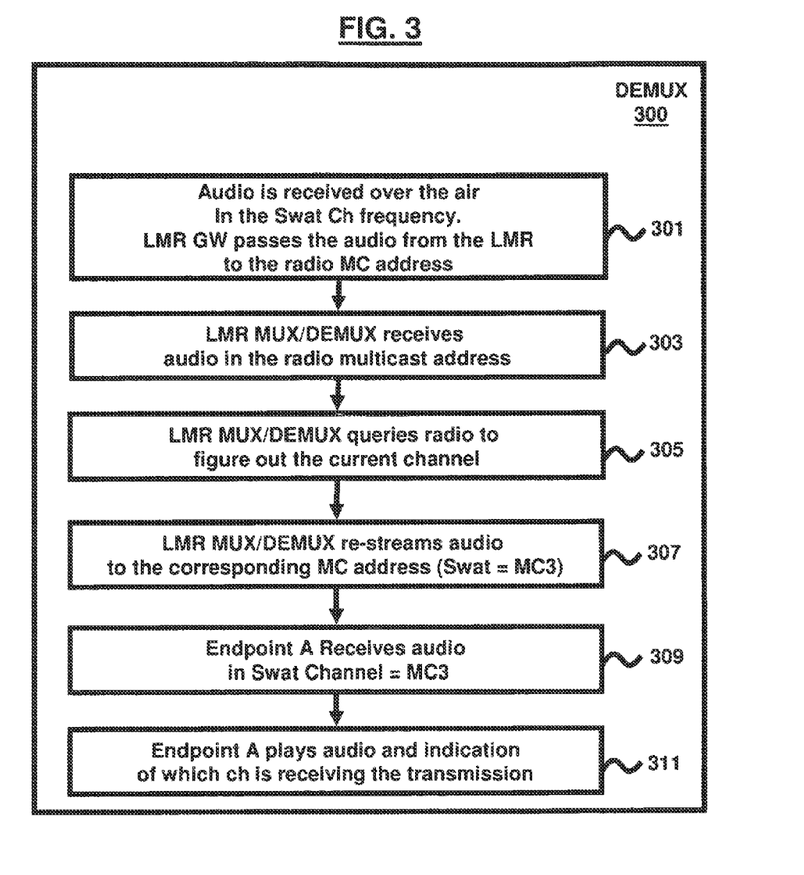
FIG. 3 is a flow diagram illustrating a processing sequence in a Demux according to an embodiment herein.

FIG. 3, with reference to FIGS. 1 and 2, is a flow diagram illustrating a processing sequence in a demux 300 of the LMR mux/demux 109 of FIG. 1 according to an embodiment herein. In this sequence, audio is received (301) over the air in the swat channel frequency and the LMR gateway 111 passes the audio from the LMR 113 to the radio MC address. Then, the LMR mux/demux 109 receives (303) audio in the radio multicast address. Next, the LMR mux/demux 109 queries (305) the radio to determine what the current channel is. After this, the LMR mux/demux 109 re-streams (307) audio to the corresponding MC address (swat=MC3). Thereafter, Endpoint A 103 receives (309) audio in swat channel=MC3. Finally, Endpoint A 103 plays (311) audio with an indication of which channel is receiving the transmission. The entire process may be repeated in a similar manner for each of Endpoint B 105 and Endpoint C 107. To paraphrase the flow diagram of FIG. 3 as described above, the LMR gateway 111 receives audio from the LMR 113 on the radio multicast address RMC, the LMR mux/demux 109 now determines which particular radio frequency channel the LMR 113 is tuned into. The LMR mux/demux 109 queries the LMR 113 over the radio control interface 115 and finds out the specific channel that the audio was received on; the swat channel in this case. From a look-up table, the LMR mux/demux 109 determines that the swat channel is mapped to multicast address MC3 and re-streams the traffic from radio multicast RMC to swat multicast MC3. The Endpoint A 103 that is tuned into the swat multicast MC3 now receives the audio and is effectively listening to the swat radio channel.

According to the embodiments herein, in order to support all current endpoints and all future endpoints in the IPICS 100, a radio control service 110 that controls the radio either via serial control or tone control also operates as an audio mux/demux 109 for the channels programmed on the radio. In other words, as the radio control service 110 holds the information of what channel the radio is tuned to, it also receives the audio from the radio and routes the audio stream to a channel specific multicast address. Using the previous example, the fire department channel (MC2) and the police channel (MC1) would each be represented by distinct multicast addresses to the end devices. Endpoints are subscribed to the multicast group of that channel and they know for sure that the incoming audio they receive is coming from the channel that they are subscribed to. When the endpoints subscribe to a multicast channel, the IP multicast layer ensures that it receives traffic only on that multicast group. In other words, if an IP endpoint successfully subscribes to a multicast group represented by a multicast IP address M1, it will receive all traffic sent to that multicast group M1 but will not be able to receive traffic destined for any other multicast group. If the IP endpoint is interested in receiving traffic for more than one multicast groups, it can and should explicitly subscribe to all the multicast groups it is interested in. The radio control service 110 and the LMR mux/demux 109 are responsible for "matching" the radio channel to a pre-selected multicast address. The mapping of multicast addresses and channels is sent to the LMR mux/demux 109 via the control interface 109 beforehand. Based on this mapping the LMR mux/demux 109 knows to route traffic for the "police" radio frequency (or radio channel)) to MC1, "fire" frequency to MC2, and "swat" frequency to MC3 based on the example above. The actual endpoints only have the designated multicast addressed they are allowed to access; i.e., the endpoint (Endpoint C 107) allowed to access only the police channel will only have MC1 information propagated to them by the IPICS 100. The IPICS 100 and the LMR mux/demux 109, in particular, thus ensure that the endpoints A-C (103-107) receive only the traffic intended for the channel for which they have subscribed. At the same time, the radio control service 110 intercepts the audio multicasted by IPICS endpoints on channel specific multicast groups and applies the appropriate access control policies.

Some of these policies could involve tuning the radio to that specific channel and then transmitting the audio via the radio, never allowing the transmissions to be sent over the radio network unless the radio is tuned to that specific channel, as well as other policies. Another example of a policy would be a listen only channel policy. For a certain radio channel, the users may desire that the endpoints may only receive the radio traffic on IP but not send any traffic back out. The LMR mux/demux 109 in this case routes the radio traffic to the desired IP multicast address but the traffic sent by the IP endpoint on the multicast will never be sent back on the radio domain. This can be controlled by a programmable switch (not shown) on the LMR mux/demux 109.

The radio control service 110 also subscribes for all the channel specific multicast addresses for a given radio. When audio is received in one of these channel specific multicast addresses, the radio control service 110 then applies the appropriate access control policies to the audio stream before proxying the audio stream to the radio for transmission. For example, the radio control service 110 may either tune the radio to that channel and proxy the audio to the radio, simply proxy the audio if the radio is already tuned to that channel, or drop the audio packets if another transmission is already occurring on a different channel on the same radio.

The embodiments herein also allow for the creation of preemption priorities for channels within a radio. For instance, if a channel is marked as _High Priority_ and audio is received on that channel's specific multicast address, the radio control service 110 could simply tune the radio and proxy the audio even if another transmission was already happening on a lower priority channel. This arbitrator role is a powerful tool when prioritization of resource usage is imperative.

According to the embodiments herein, endpoints use a different multicast address for a channel, even if many of these channels are present in a single radio. The radio control service 110 maps the multicast address from the radio to multiple channel specific multicast addresses based on the configuration received from the IPICS management system 101. Because the radio control service 110 is aware of which channel the radio is tuned to when audio is received from the radio, it is routed to the appropriate channel specific multicast address. This assures that all endpoints in the IPICS 100 can receive the audio stream and know for sure that the audio stream is from a specific radio channel.

According to the embodiments herein, the IP media endpoints that are not aware of radio resources can still leverage the full features of IPICS media communications over radios. In this regard, the LMR gateway 111, the radio control service 110, and the LMR mux/demux 109 on the radio control service 110 completely disables the radios from the IP endpoints. To the IP endpoints, when they want to communicate with a radio for control functions, all they do is send IP data messages and radio identifier to the IP address and port that on which the radio control service 110 is running. The radio control service 110 and the LMR gateway 111 take care of the actual communication with the radio devices. Similarly for the audio traffic, all that the IP endpoints see is a multicast address for any radio channel on which they want to communicate. The routing/mapping of those multicast addresses to the radio frequency channel is abstracted away from the IPICS endpoints and taken care of again by the LMR gateway 111 in conjunction with the radio control service 110 and LMR mux/demux 109.

Moreover, the IPICS 100 secures access to radio resources the same way that it secures access to regular channels. In this regard, the radio control service 110 simply enforces those policies. As illustrated by the two example policies above, the policies translate into blocking the flow of traffic between certain multicast addresses and the radio frequencies, uni-directionally or bi-directionally. This is conveyed to the radio control service 110 as a policy. A policy is typically represented by a data structure. As an example, such a data structure may encapsulate the following information: the radio frequency to multicast address map, a flag indicating whether to block traffic, and another flag indicating whether the blocking should be performed uni-directionally or bi-directionally. Furthermore, the embodiments herein support radio control in conjunction with channel specific addresses. As previously mentioned, the conventional IPICS solutions do not support the coexistence of both environments. Additionally, the embodiments herein provide precise information about the audio content being received, independently of the source of the information (e.g. IP or radio). Also, users in the radio interoperability environment can take advantage of such functionality to provide better usage of radio resource and enforce resource access policies.

Figure 4:
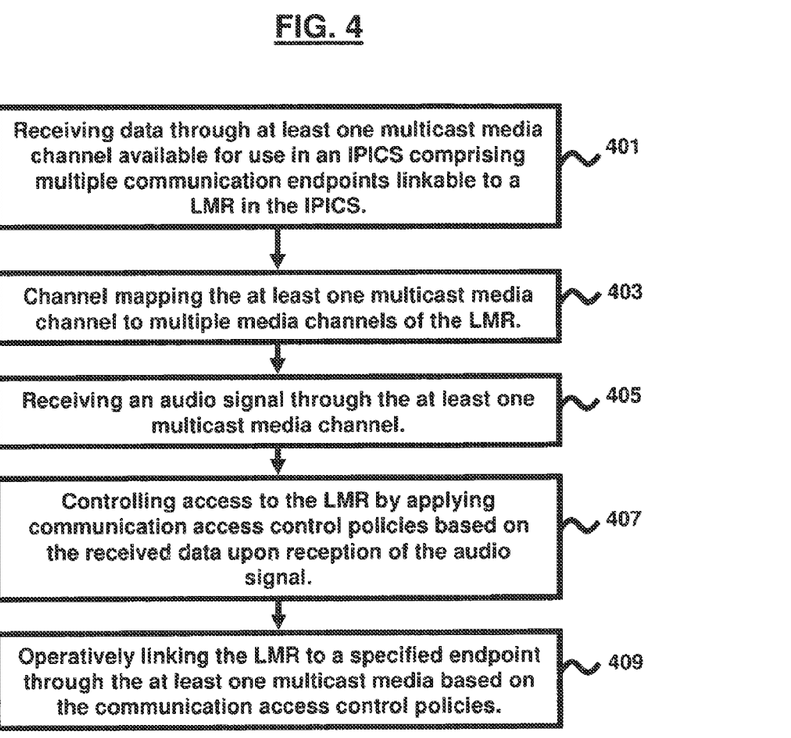
FIG. 4 is a flow diagram illustrating a method according to an embodiment herein.

FIG. 4, with reference to FIGS. 1 through 3, is a flow diagram illustrating a method of multiplexing and demultiplexing radio channels, wherein the method comprises receiving (401) data (e.g., through a communications port(s) (not shown) located on a mux/demux 109) through at least one multicast media channel MC1, MC2, MC3 available for use in an IPICS 100 comprising multiple communication endpoints A-C (103-107) linkable to a LMR 113 in the IPICS 100; channel mapping (403) the at least one multicast media channel MC1, MC2, MC3 to multiple media channels of the LMR 113; receiving (405) an audio signal (e.g., through a communications port(s) (not shown) located on a mux/demux 109) through the at least one multicast media channel MC1, MC2, MC3; controlling (407) access to the LMR 113 by applying communication access control policies based on the received data upon reception of the audio signal; and operatively linking (409) the LMR 113 to a specified endpoint through the at least one multicast media channel MC1, MC2, MC3 based on the communication access control policies. The controlling access process (407) may comprise tuning the LMR 113 to a specified multicast media channel; proxying the audio signal to the LMR 113; and directing only one-way communication from the LMR 113 to the multiple communication endpoints A-C (103-107).

Additionally, the controlling access process (407) may comprise dropping reception of the audio signal if another transmission of audio signals is previously and simultaneously occurring on a different media channel on the LMR 113. Furthermore, the controlling access process (407) may comprise creating a priority of channels on the LMR 113; receiving a first audio signal on a first channel; receiving a second audio signal on a second channel; comparing priorities assigned to the first and second channels; and dropping reception of audio signals corresponding to lower prioritized channels.

The method may further comprise re-streaming the audio signal to a radio multicast upon receipt of the audio signal from the at least one multicast media channel MC1, MC2, MC3; sending the re-streamed audio signal to the LMR 113; and transmitting the re-streamed audio signal in a specified multicast media channel frequency over the air. Moreover, the method may further comprise querying the LMR 113 to determine what channel the LMR 113 is currently tuned to; re-streaming the audio signal to the at least one multicast media channel MC1, MC2, MC3; and receiving the re-streamed audio signal and an identification of the tuned channel in the specified endpoint in the at least one multicast media channel MC1, MC2, MC3. Also, the communication endpoints A-C (103-107) may comprise any of PMCs, IP Phones over multicast, IP and PSTN phones over IP Telephony gateway, and radios over LMR gateways.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi-chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
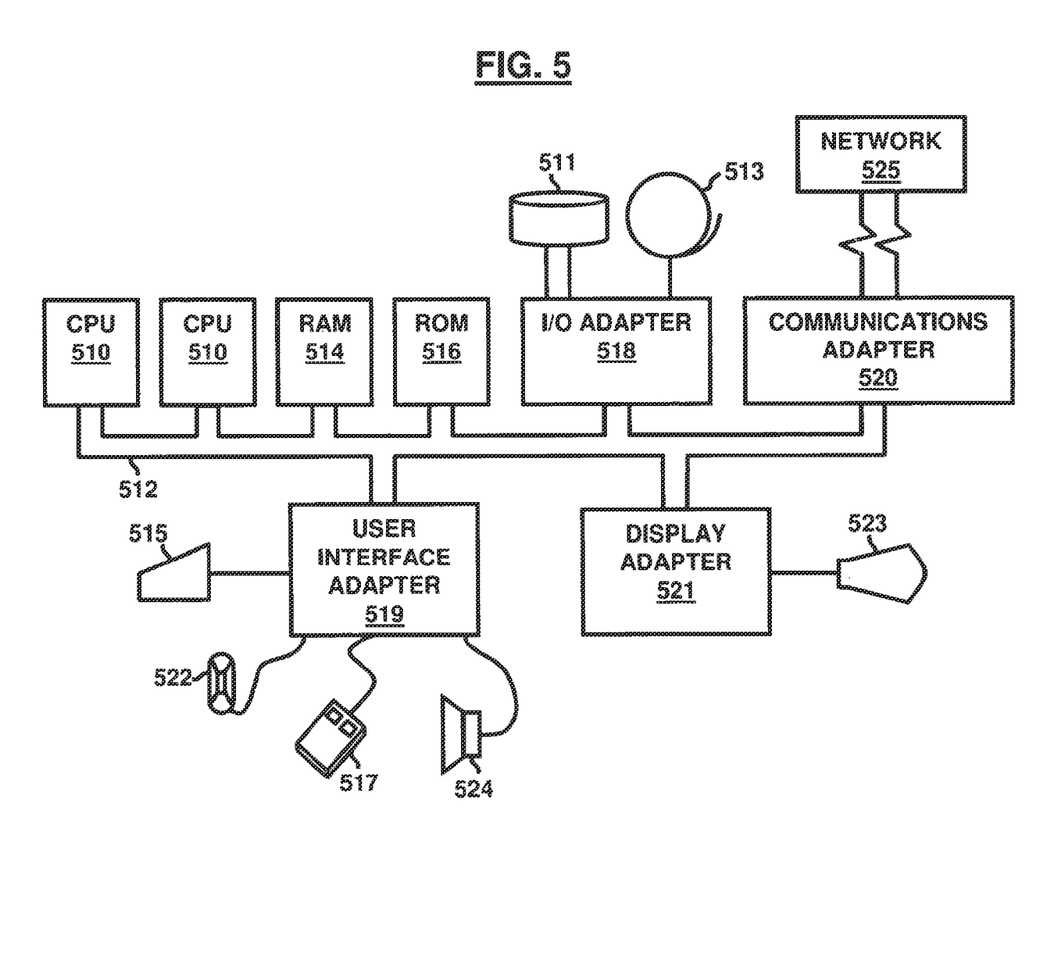
FIG. 5 illustrates a schematic diagram of a computer architecture used in accordance with the embodiments herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 510. The CPUs 510 are interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of the embodiments herein. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The embodiments herein leverage the radio control service 110 and its capabilities to provide a seamless interface between the IPICS endpoints A-C (103-107) and the channels residing on a radio resource. The radio control service 110 uses its radio control capabilities and the IPICS server configuration data to provide the multiplexing and demultiplexing functionality for channels on a radio resource.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method, comprising:
   receiving data in a multicast channel;
   receiving channel mapping information from an Internet Protocol Interoperability and Communications System (IPICS) management system;
   using the channel mapping information to map the multicast channel to a radio multicast channel;
   receiving an audio signal through the multicast channel;
   controlling access to a Land Mobile Radio (LMR) by applying a communication access control policy based on the received data upon reception of said audio signal and by sending, over a communication channel, a command for tuning, by a device, said LMR to the radio multicast channel; and
   operatively linking said LMR to an endpoint through said multicast channel based on said communication access control policy by re-streaming the audio signal from the device over the radio multicast channel to the LMR.

2. The method of claim 1, further comprising:
   directing a one-way communication from the LMR to a plurality of communication endpoints.

3. The method of claim 1, further comprising:
   dropping a reception of the audio signal if another transmission of audio signals is occurring on a different media channel on the LMR.

4. The method of claim 1, further comprising:
   creating a priority of channels on the LMR;
   receiving a first audio signal on a first channel;
   receiving a second audio signal on a second channel;
   comparing priorities of the first and second channels; and
   dropping a reception of at least one of the first audio signal and the second audio signal based on the priorities.

5. The method of claim 1, wherein the tuning is performed using a control interface.

6. The method of claim 1, wherein a first endpoint provides the audio signal, and the first endpoint comprises any of a push-to-talk media center (PMC), an internet protocol (IP) Phone, a public switched telephone network (PSTN) phone, and a radio.

7. An apparatus, comprising:
   a processor coupled to a memory; and
   a multiplexing element, wherein the apparatus is configured to
   receive data in a multicast channel;
   receive channel mapping information from an Internet Protocol Interoperability and Communications System (IPICS) management system;
   use the channel mapping information to map the multicast channel to a radio multicast channel;
   receive an audio signal through the multicast channel;
   control access to a Land Mobile Radio (LMR) by applying a communication access control policy based on the received data upon reception of said audio signal and by sending, over a communication channel, a command to tune said LMR to the radio multicast channel; and
   operatively link said LMR to an endpoint through said multicast channel based on said communication access control policy by re-streaming the audio signal over the radio multicast channel to the LMR.

8. The apparatus of claim 7, wherein the apparatus is further configured to direct a one-way communication from the LMR to a plurality of communication endpoints.

9. The apparatus of claim 7, wherein the apparatus is further configured to drop a reception of the audio signal if another transmission of audio signals is occurring on a different media channel on the LMR.

10. The apparatus of claim 7, wherein the apparatus is further configured to
    create a priority of channels on the LMR;
    receive a first audio signal on a first channel;
    receive a second audio signal on a second channel;
    compare priorities of the first and second channels; and
    drop a reception of at least one of the first audio signal and the second audio signal based on the priorities.

11. The apparatus of claim 7, wherein the apparatus is further configured to tune the LMR to a frequency using a control interface.

12. The apparatus of claim 7, wherein the audio signal is re-streamed to an LMR gateway for a subsequent delivery to the LMR.

13. Logic encoded in one or more non-transitory media that includes code for execution and that, when executed by a processor, is operable to perform operations comprising:
    receiving data in a multicast channel;
    receiving channel mapping information from an Internet Protocol Interoperability and Communications System (IPICS) management system;
    using the channel mapping information to map the multicast channel to a radio multicast channel;
    receiving an audio signal through the multicast channel;
    controlling access to a Land Mobile Radio (LMR) by applying a communication access control policy based on the received data upon reception of said audio signal and by sending, over a communication channel, a command for tuning, by the processor, a Land Mobile Radio said LMR to the radio multicast channel; and operatively linking said LMR to an endpoint through said multicast channel based on said communication access control policy by re-streaming the audio signal from the processor over the radio multicast channel to the LMR.

14. The logic of claim 13, the operations further comprising:
creating a priority of channels on the LMR;
receiving a first audio signal on a first channel;
receiving a second audio signal on a second channel;
comparing priorities of the first and second channels; and
dropping a reception of at least one of the first audio signal and the second audio signal based on the priorities.

15. The method of claim 1, wherein the communication access control policy prevents a transmission sent over a radio network unless the LMR is tuned to the radio multicast channel.

16. The method of claim 1, wherein the LMR transmits the audio signal in a multicast media channel frequency over the air.

17. The method of claim 1, wherein the policy maps a radio frequency to a multicast address, indicates whether to perform a blocking of traffic, and indicates whether the blocking should be performed uni-directionally or bi-directionally.

18. The apparatus of claim 7, wherein the communication access control policy prevents a transmission sent over a radio network unless the LMR is tuned to the radio multicast channel.

19. The apparatus of claim 7, wherein the LMR transmits the audio signal in a multicast media channel frequency over the air.

20. The logic of claim 13, wherein the communication access control policy prevents a transmission sent over a radio network unless the LMR is tuned to the radio multicast channel.

21. The logic of claim 13, wherein the LMR transmits the audio signal in a multicast media channel frequency over the air.

\* \* \* \* \*